March 25, 1952 R. F. BROYHILL 2,590,677
TRACTOR MOUNTED SPRAY DEVICE
Filed June 28, 1948 2 SHEETS—SHEET 1

INVENTOR.
Roy F. Broyhill
BY
Sam J. Slotsky
ATTORNEY

March 25, 1952  R. F. BROYHILL  2,590,677
TRACTOR MOUNTED SPRAY DEVICE
Filed June 28, 1948  2 SHEETS—SHEET 2

INVENTOR.
Roy F. Broyhill
BY
Sam J. Slotky
ATTORNEY

Patented Mar. 25, 1952

2,590,677

UNITED STATES PATENT OFFICE 2,590,677

TRACTOR MOUNTED SPRAY DEVICE

Roy F. Broyhill, Dakota City, Nebr.

Application June 28, 1948, Serial No. 35,715

1 Claim. (Cl. 299—45)

My invention relates to a spray device which can be attached to tractors or other vehicles.

An object of my invention is to provide a spraying arrangement wherein weed killing fluids, or similar fluids are forced by means of a suitable pump arrangement through transversely extending pipe members and thence sprayed on the ground for the necessary purpose.

A further object of my invention is to provide such a spraying arrangement wherein the extending pipe members include resilient joint connections whereby when striking obstacles or when passing through a gateway, the resiliently mounted pipe members will be urged inwardly without any danger of undue shock, and for also passing through the restricted spaces.

A further object of my invention is to provide means wherein the pipe members can be raised to a vertical position for similar reasons.

A further object of my invention is to provide means for raising the transverse pipe members to any desired elevation above the ground surface, maintaining the pipes in such elevation, and yet maintaining the spray nozzles at the same angle with respect to the ground regardless of the elevated position of the pipes.

A further object of my invention is to provide a structure wherein the pipe members include certain sediment traps, as well as certain check valve means for guarding against dripping of the fluid to prevent an excessive killing action.

A further object of my invention is to provide guard means associated with the pipe members to prevent wastage of the sprayed fluid.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1:
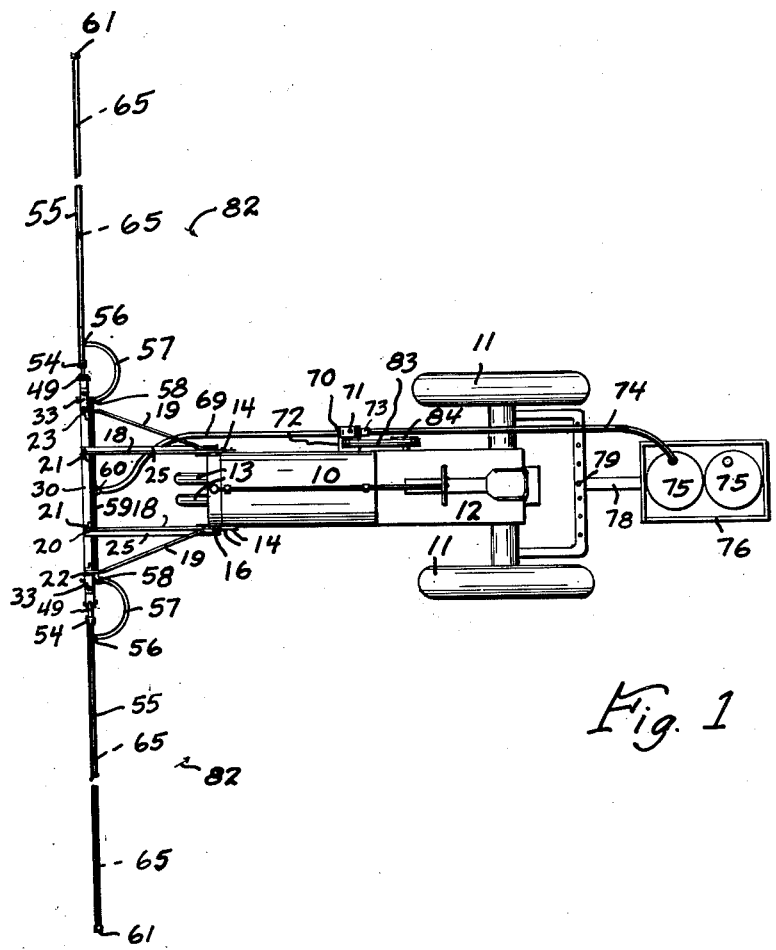
Figure 1 is a plan view of my arrangement as attached to a tractor.

My invention contemplates the provision of an arrangement which can be readily attached to a tractor, or any other similar vehicle, and wherein such attachment provides means for ejecting a sprayed liquid onto the ground surface, and wherein the extending portions of the arrangement are jointed in such a way so that the extending portions can be folded inwardly or upwardly as desired, and to further provide other advantages in such an arrangement.

I have used the character 10 to designate the hood of a tractor, the character 11 the rear wheels thereof, the character 12 the base, and the character 13 the forward wheels thereof.

For attaching my arrangement to the tractor, I provide a pair of plates 14 which are suitably secured by means of bolts 15 to the sides of the forward framework portions of the tractor. Attached to the plates 14 are a pair of further vertical plates 16 to which are pivotally attached at 17 a pair of inner strap members 18 and outer strap members 19, which strap members normally extend horizontally, the inner strap members 18 being pivotally secured at 20 to the short vertical angle members 21, the outer straps 19 being pivotally attached at 22 to the longer upwardly extending angle members 23, the straps 19 being bent outwardly as shown clearly in Figure 1. Also pivotally secured at 24 to the plate 14 are a pair of further forwardly extending angle members 25 which are pivotally secured at 26 to the angle members 21.

The plates 14 include a series of equally spaced openings 27 arranged at a fixed radial distance from the pivoting point 24, the members 25 including further openings 28 for the reception of the pins or bolts 29 whereby the pins 29 can be placed in any of the selected openings 27 consistent with the raised position of the unit, as will be explained hereinafter.

A transverse angle member 30 is joined at 31 (see Figure 4) between the angle members 23, and attached at 32 to the angle members 23 are a pair of outwardly extending bars 33 between which bars is received the square member 34, a bolt 35 passing through these members. Attached at 36 to the member 34 is a downwardly extending bar 37 to which is attached at 38 a fairly strong helical spring 39 which is attached at 40 to a threaded stud 41, which passes through an opening 42 in the downwardly turned flange 43 which extends from the member 44 which is attached to one of the lower members 33 at 45, and is positioned at right angles thereto as shown more clearly in Figure 5. A nut 46 is threadably engaged with the stud 41 to provide adjustable tensioning of the spring 39. Extending from the member 44 is the vertical flange 47.

The member 34 is preferably in the shape of a square hollow tube, and includes a cutout portion wherein a pair of extending ears 48 are provided, and positioned between these ears is a bar 49 terminating at 50, whereby a portion of the member 49 will normally underlie the upper portion 51 of the member 34 to retain the extending pipe arrangements in fixed position, with the members 49 being pivotally secured to the ears 48 by means of the bolts 52. The members 49 terminate in the pipes or solid rods 53 which are coupled by means of couplings 54 to the lengthened transverse pipe members 55, and communicating with the pipe members 55 are the short nipples 56 to which are attached the rubber or other resilient pipes 57 which are attached at 58 to the extremities of the centrally arranged pipe 59 which is suitably secured in any desired manner at the rear of the angle member 30, the pipe 59 having a central opening at 60.

The pipes 55 are capped at 61 and communicating with the pipes 55 at equally spaced intervals are the short stub pipes 62 which include the housings 63 in which housings are received the check valves 64. The spray nozzles 65 are attached at the ends of the pipes 62 and beneath the members 63. Threadably engaged at 66 within the pipes 62 are the further short nipples 67 which include a portion 68 thereof, which extends substantially above the lower edges of the pipes 55, this arrangement serving to provide means for the entrapment of sediment in the weed eradicating fluid, or other fluid, thus preventing the transference of such sediment to the sprays which in many cases would interfere with the operation thereof.

Figure 2:
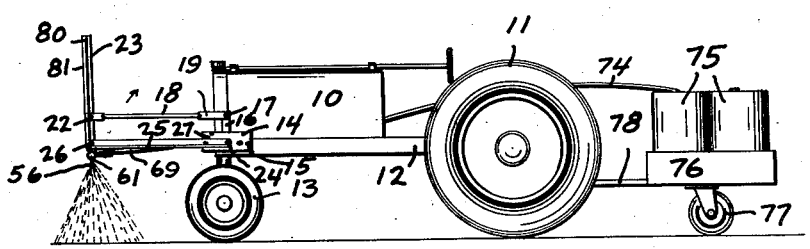
Figure 2 is a side elevation of Figure 1.
Figure 3:
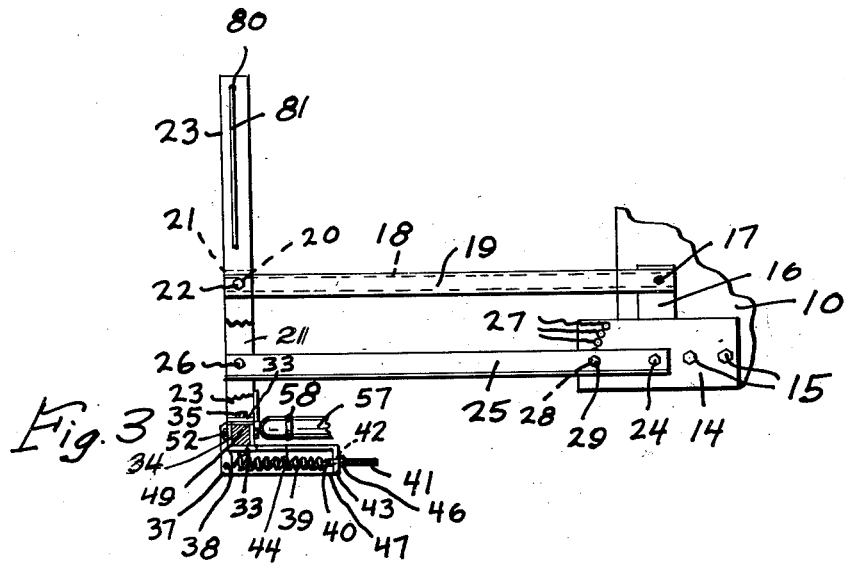
Figure 3 is an enlarged detail.

Attached to the opening 60 is the lengthened flexible pipe 69 which is attached at 70 to a pump 71 which is suitably mounted on a bracket 72 which is suitably attached to the side of a tractor, the pump 71 communicating with a strainer unit 73, which in turn communicates with a further pipe 74 which passes to one of the drums 75 containing the fluid to be sprayed, Figures 1 and 2 showing an auxiliary drum also, these drums being contained within a trailer 76 having the centrally arranged wheel 77, the trailer 76 being hitched by means of the hitching member 78 which is attached at 79 to the tractor draw-bar, it being understood of course that any other means of supporting the fluid can be used whether carried on the tractor itself or otherwise.

Attached at 80 to the vertical angle members 23 are the laterally extending cables 81 which are attached to the caps 61 thereby serving to additionally support the laterally extending pipes 55.

It will now be noted that as the tractor is driven forwardly, and when the units are in the position as shown in Figures 1 and 2, that the ground surface will be efficiently sprayed by virtue of the pumping action of the pump, and with the spray being formed in the spray nozzles 65, and thence directed downwardly onto the ground. It will also be noted that in the event either one of the pipes 55 strikes against an obstacle, that the spring 39 will absorb all of such impact by virtue of its connection to the member 37 and the pivotal action on the bolt 35. The arrow 82 indicates the direction of pivotal movement of the pipes 55 when the pipes strike against an obstacle. The resilient pipes 57 absorb any pivotal motion of the extending spray pipes.

Figure 4:
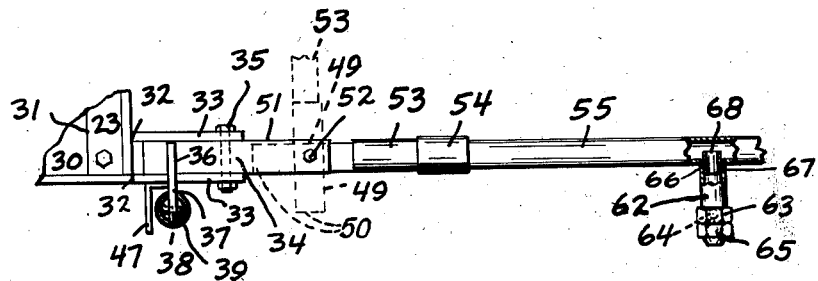
Figure 4 is an enlarged detail of one of the resilient joints.
Figure 5:
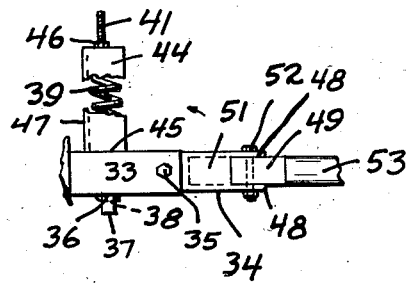
Figure 5 is a forward view of a portion of Figure 4.

It will be further noted that when it is desired to elevate the members 55 to vertical position for passing through gates or the like, they can be pivoted vertically about the bolts 52 to the upward position as shown in Figure 4.

The spray jets can be raised to desired position above the ground level as explained above, by raising the various members 18, 19 and 25 about the pivotal centers 17 and 24, the constant parallelogram feature maintaining the members 23, as well as the jets in the same vertical position at all times as will be readily apparent, the bolts 29 serving to hold the unit in any selected raised position, by inserting these bolts in any of the selected openings 27, and in some cases where the jets may be inclined, the same feature will apply.

The check valves 64 are set for a pre-determined pressure so that at very low pressures the check valves will close the sprays, thereby preventing dripping of the liquid which would have the objectionable feature of providing excess fluid where such excess is not desired.

Figure 6:
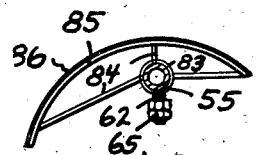
Figure 6 is a detail of the modified form showing the spray guard arrangement.

Figure 6 illustrates a modified form of structure wherein attached to the pipes 55 are the rings 83 to which are attached the brackets 84 which are attached to the substantially arcuate members 85 to which members are attached the canvas or other coverings 86, these coverings extending the entire length of the pipes 55. The purpose of this arrangement is to prevent the spray from being wasted, the entire spraying action thence being applied downwardly.

As shown in Figure 1, the pump 71 is driven by means of a pair of belts 83 passing over the pulley 84 which is the usual power driven pulley of the tractor, it being understood however that the pump can be powered from the tractor by any other means.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A tractor mounted spray device comprising a framework attached to the forward end of the tractor, laterally extending spraying pipe members, joints between said framework and said spraying pipe members, said joints including ears extending from said framework, square members positioned between said ears and pivoted thereto, springs attached to the inner end of said square members, said ears including extending portions to which said springs are attached, said square members including further extending ears, said spraying pipe members including extending portions received between said further extending ears and pivotally secured thereto, said further extending ears being positioned at right angles to said ears.

ROY F. BROYHILL.

REFERENCES CITED

The following references are of record in the file of this patent:

UNITED STATES PATENTS

| Number | Name | Date |
| --- | --- | --- |
| 699,292 | Doerr | May 6, 1902 |
| 872,654 | Heard | Dec. 3, 1907 |
| 1,043,929 | Heard | Nov. 12, 1912 |
| 1,172,686 | Eckart et al. | Feb. 22, 1916 |
| 1,663,263 | Sharp | Mar. 20, 1928 |
| 1,886,369 | Bogart | Nov. 8, 1932 |
| 2,149,660 | Blood, Jr. | Mar. 7, 1939 |
| 2,169,948 | Gallupe | Aug. 15, 1939 |
| 2,246,866 | Stribling et al. | June 24, 1941 |
| 2,367,594 | Madison | Jan. 16, 1945 |